INVENTORS
DONALD M. SMYTH
GEORGE A. SHIRN
BY Connolly and Hutz
THEIR ATTORNEYS

United States Patent Office 3,308,350
Patented Mar. 7, 1967

3,308,350
CAPACITOR WITH DIELECTRIC FILM HAVING PHOSPHORUS - CONTAINING COMPONENT THEREIN
Donald M. Smyth and George A. Shirn, Williamstown, Mass., assignors to Sprague Electric Company, North Adams, Mass., a corporation of Massachusetts
Filed June 17, 1964, Ser. No. 375,859
10 Claims. (Cl. 317—230)

The present invention relates to electrical capacitors and to a process for producing the same.

A highly commercial capacitor in the industry comprises an anodized porous metal pellet having a semiconducting oxide layer disposed on the surfaces thereof. A method of manufacturing this type of capacitor comprises anodizing a porous metal pellet in an appropriate electrolyte; impregnating the anodized pellet with a solution of a semiconducting oxide precursor, and pyrolyzing the precursor to form the semiconducting oxide. To complete the unit, a cathode contact, e.g., graphite and/or silver, is applied thereto and it is then canned or otherwise packaged.

During the manufacture of transition metal (Ta, Nb, Ti, Zr, etc.) capacitors there is a tendency at elevated temperatures for the oxygen of the anodic oxide to be transported to and dissolved in the anode metal. As this mechanism continues, what might be termed an oxygen deficiency is created across the anodic oxide. When this deficiency, which begins at the metal-metal oxide interface, reaches the air-oxide interface, oxygen begins to enter the oxide and a dynamic equilibrium is quickly established. A gradient of oxygen deficiency exists across the oxide film, with the most deficient region being adjacent to the anode metal. The oxygen deficiency creates an N-type semiconductor, the result being a gradient of conductivity across the dielectric film. When a counterelectrode is applied to the anodic oxide, e.g., an aqueous electrolyte, a solid electrotlyte or a metal, to complete the capacitor and a comparison is made with a capacitor which has not been subjected to heat, the data reveal a substantial increase in capacitance and dissipation factor in the unit which had been exposed to heat. Moreover, the dependence of these properties on temperature, frequency and D.C. bias is greatly increased by reason of said exposure to heat.

Extensive studies have lead to the conclusion that a heat-treatment during capacitor manufacture or subjection of the unit to heat after manufacture will introduce undesirable dielectric properties and aging characteristics which will lead to very high leakage currents and failure.

It is, therefore, an object of the instant invention to overcome the foregoing problem.

Another object is to present a capacitor stable to the effects of heat.

Still another object is to present a process for preparing a capacitor stable to the effect of heat.

Other objects and advantages of the present invention will be made obvious to those skilled in the art by the following description when considered in relation to the accompanying drawing of which:

In studying the foregoing problem, the inventors have discovered that the deleterious effects that heat has on metal oxide dielectric capacitors is greatly retarded by the presence of phosphorus in the anodic dielectric. This strongly suggests that in some manner the phosphorus decreases the mobility of the oxygen in the oxide to a considerable degree. Further indication is that oxygen-uptake of phosphorus-containing samples at high temperatures is much slower, as determined by the rate of weight increase during heating.

It has been determined that oxygen mobility and migration from the base metal oxide to the base metal is effectively inhibited by establishing the proper distribution of phosphorus throughout the anodic oxide layer. This distribution ranges from a concentration not substantially greater in the region remote from the base metal than in the region adjacent to the base metal, to a distribution substantially more concentrated in the region adjacent to the base metal than in the region remote from the base metal. In other words, the phosphorus can be substantially uniformly distributed throughout the oxide; or it can be quite concentrated in the region adjacent to the base metal; it cannot, however, be substantially more concentrated in the region remote from the base metal than the region adjacent to the base metal. If this latter situation does exist, the resulting capacitor will have an oxide having dielectric properties which are unusually dependent upon temperature and frequency.

In its broadest scope the present invention is directed to an electrical capacitor comprising an anode and a cathode separated by an anodic oxide layer, said anodic oxide layer having an oxygen migration inhibiting element distributed therein, the distribution ranging from a concentration not substantially greater in the region remote from the anode than in the region adjacent to the anode, to a distribution substantially more concentrated in the region adjacent to the anode than in the region remote from the anode. More specifically the invention is directed to a capacitor wherein said oxygen migration inhibiting element is phosphorus.

Figure 1:
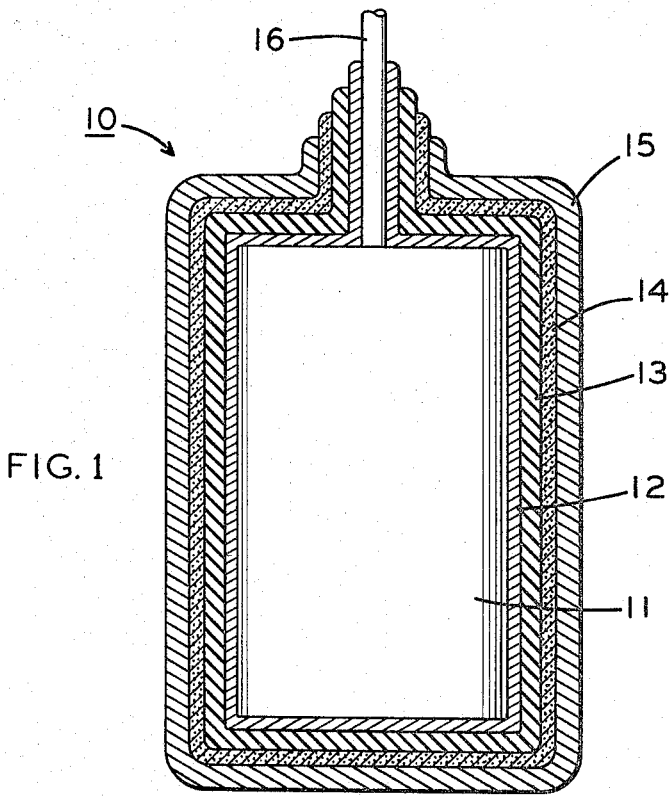
FIGURE 1 is a vertical cross section of a solid electrolyte capacitor.

Referring to the drawings: FIGURE 1 depicts a solid electrolyte niobium capacitor 10 employing a porous niobium pellet 11 having a lead 16 affixed thereto. A phosphorus-containing niobium oxide dielectric layer 12 is formed on all the surfaces of pellet 11. In intimate contact with this dielectric film is a semiconducting layer 13, for example, the semiconductive manganese or lead dioxides or other suitable semiconductive material. An optional contact layer 14, e.g., graphite, is applied to the semiconductive layer. A contact electrode 15, e.g., silver, is the final layer. The entire unit can be encased in a metal can or tube, having one or both ends hermetically sealed with a glass-to-metal end seal.

Figure 2:
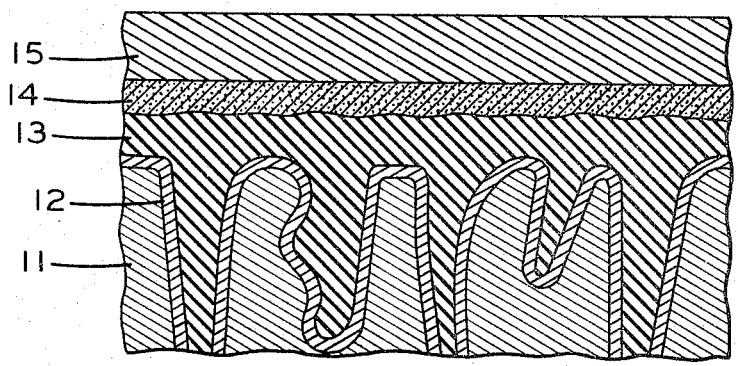
FIGURE 2 is a diagrammatic representation of a magnified cross section of the capacitor section of FIGURE 1.

FIGURE 2 graphically illustrates a magnified cross section of part of the unit of FIGURE 1. This figure shows the character of and relationship between the several layers. The phosphorus-containing dielectric oxide 12 is shown lining the pore surfaces of anode 11. Semiconductive layer 13 substantially fills the oxide-coated pores. Contact layer 14 and contact electrode 15 complete the capacitor.

The phosphorus-containing dielectric oxide can be formed by any process which will result in the proper distribution of phosphorus throughout the dielectric oxide. For example, niobium and tantalum, which are the preferred anode metals, have been diffused with phosphorus by placing the metal, in a Pyrex or quartz tube containing red phosphorus, evacuating the tube, sealing it off and heating it. Thereafter, the phosphorus-containing metal is anodized to form the phosphorus-containing dielectric oxide which constitutes the essence of the present invention. The capacitor is then completed by a standard process. This method of incorporating phosphorus ultimately in the oxide, yields a phosphorus distribution which is substantially uniform throughout the oxide, or at most, not substantially greater in the region remote from the metal-metal oxide interface.

Another technique whereby phosphorus is distributed or diffused within the base metal in a controlled manner is by cathodic sputtering of the metal in a phosphorus-containing atmosphere. The later formed oxide will then contain phosphorus substantially uniformly distributed throughout.

Anodization of the base metal in a comparatively concentrated phosphoric acid electrolyte does not provide, as one might expect, an easy solution to the problem. Such anodization results in a duplex film which contains phosphorus in only an outer portion of the oxide. This leaves a heat-sensitive region in the oxide next to the base metal which will be depleted of oxygen very quickly by heat-treatment. The phosphorus-containing outer layer of oxide will prevent oxygen from the air from reaching this inner, depleted region. A capacitor containing such an anodized electrode, would have an oxide, the dielectric properties of which would be unusually dependent upon temperature and frequency.

If one is willing to tolerate the imbalance of phosphorus in the dielectric which results from phosphoric acid electrolyte anodization, this anodization should be carried out in a comparatively dilute phosphoric acid electrolyte. This will tend to minimize the effects of the phosphorus imbalance.

The following is a specific example of the instant invention as applied to a solid electrolyte tantalum capacitor.

Example

A porous tantalum pellet of about 0.43 inch high and 0.18 inch in diameter of about 30% porosity was heated in a Pyrex tube to about 600° C. in 500 torr of phosphorus vapor for about 6 hours. Thereafter, the pellet was anodized to a voltage of 150 v. in a 0.1% solution of $H_2SO_4$. The formed anode was then impregnated with a 50% water solution of manganous nitrate. The impregnated unit was then pyrolyzed at 400° C. to convert the nitrate to maganese dioxide. The impregnation-pyrolysis sequence was repeated a number of times to insure complete coating of the dielectric oxide with the semiconducting manganese dioxide. Reanodized in 0.1% $H_2SO_4$ to 65 volts the capacitor was then completed by applying on the unit a graphite contact layer and a silver contact electrode. The electrical characteristics of this unit were compared with a control unit which had not been phosphorus-diffused. The RC of the phosphorus-containing unit was about one-third and the leakage current about one-fifth of the control unit. Under severe aging conditions, i.e., 35 volts at 125° C. the capacitance and RC of the control unit changed at a considerably greater rate than the phosphorus-containing unit.

Experience has indicated that the rate of thermal degradation of the phosphorus-containing unit can be depressed by as much as a factor of 100 as compared with non-phosphorus-containing units.

While the inventors do not intend to be limited to a precise numerical range concerning the percentage of phosphorus in the dielectric layer, since even trace amounts, properly distributed throughout the layer, would be beneficial, it is recognized that an optimum range extends from the amount of phosphorus which would be diffused at 500° C., 300 torr of phosphorus vapor during about 6 hours to that diffused at 700° C., 600 torr, during about 6 hours. The particular process by which the phosphorus is dispersed throughout the dielectric is not important so long as a distribution within the above defined range is obtained.

Because of the extreme sensitivity of the niobium-niobium oxide system to heat, the invention is particularly applicable to improving niobium capacitors. It should be understood, however, that the invention extends to improving any of the capacitors employing a valve-metal which accepts migrating oxygen, e.g., tantalum and titanium.

The anode metal may be in any of the conventional forms, e.g., porous pellet, wire, foil, etc. The counterelectrode may be the same as or a different metal than the anode metal or it may be a liquid or solid electrolyte.

As is evident from the foregoing, the invention is not to be limited to the rather specific illustrative device. Modifications and variations, as well as the substitutions of equivalents may be made without departing from the spirit of the invention as defined in the appended claims.

We claim:

1. An electrical capacitor comprising an anode having an anodic dielectric oxide layer formed on the surface thereof and including a phosphorus-containing component distributed throughout said layer, a cathode disposed on said dielectric layer, said phosphorus-containing component within said dielectric layer ranging from a concentration not substantially greater in the region remote from the anode than in the region adjacent to the anode, to a distribution substantially more concentrated in the region adjacent to the anode than in the region remote from the anode.

2. An electrical capacitor comprising a porous metal pellet having an anodic dielectric layer formed on the surface thereof and including a phosphorus-containing component distributed throughout said layer, a counterelectrode disposed on said dielectric layer, said phosphorus-containing component ranging in distribution within said dielectric layer from a concentration not substantially greater in the region remote from the anode than in the region adjacent to the anode, to a distribution substantially more concentrated in the region adjacent to the anode than in the region remote from the anode.

3. The capacitor of claim 2 wherein the counterelectrode is a semiconducting oxide.

4. The capacitor of claim 2 wherein the counterelectrode is a liquid electrolyte.

5. The capacitor of claim 2 wherein the counterelectrode is a metal.

6. An electrical capacitor comprising a phosphorus-containing anode having an anodic dielectric oxide layer formed on the surface thereof and including a phosphorus-containing component distributed throughout said layer, a cathode disposed on said oxide layer, said phosphorus-containing component ranging in distribution within said dielectric layer from a concentration not substantially greater in the region remote from the anode than in the region adjacent to the anode, to a distribution substantially more concentrated in the region adjacent to the anode than in the region remote from the anode.

7. An electrical capacitor comprising a porous tantalum anode pellet having an anodic dielectric oxide layer formed on the surface thereof and including a phosphorus-containing component distributed throughout said layer, a semiconducting oxide layer disposed on said dielectric oxide layer; said phosphorus-containing component ranging in distribution within said dielectric layer from a concentration not substantially greater in the region remote from the anode than in the region adjacent to the anode, to a distribution substantially more concentrated in the region adjacent to the anode than in the region remote from the anode.

8. The capacitor of claim 7 wherein said semiconducting oxide is manganese dioxide.

9. An electrical capacitor comprising a porous niobium anode pellet having an anodic dielectric oxide layer formed on the surface thereof and including a phosphorus-containing component distributed throughout said layer, a semiconducting oxide layer disposed on said dielectric layer; said phosphorus-containing component ranging in distribution within said dielectric layer from a concentration not substantially greater in the region remote from the anode than in the region adjacent to the anode, to a distribution substantially more concentrated in the region adjacent to the anode than in the region remote from the anode.

10. The capacitor of claim 9 wherein said semiconducting oxide is manganese dioxide.

References Cited by the Examiner

UNITED STATES PATENTS

| | | | |
|---|---|---|---|
| 2,021,455 | 11/1935 | Lilienfeld | 317—230 |
| 2,038,616 | 4/1936 | Van Geel et al. | 317—230 |
| 2,174,841 | 10/1939 | Robinson | 317—230 |
| 3,120,695 | 2/1964 | Burnham | 317—230 |

JAMES D. KALLAM, *Primary Examiner.*